United States Patent
Rakotoharison et al.

(10) Patent No.: US 11,743,920 B2
(45) Date of Patent: *Aug. 29, 2023

(54) CHANNEL CONFIGURATION IN DEVICE-TO-DEVICE COMMUNICATIONS

(71) Applicant: NEC Corporation, Tokyo (JP)

(72) Inventors: Lanto Rakotoharison, Berkshire (GB); Abdoulaye Bagayoko, Berkshire (GB); Caroline Jactat, Berkshire (GB); Philippe Delahaye, Berkshire (GB)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,549

(22) Filed: Aug. 15, 2022

(65) Prior Publication Data
US 2022/0394689 A1  Dec. 8, 2022

Related U.S. Application Data

(63) Continuation of application No. 17/190,866, filed on Mar. 3, 2021, now Pat. No. 11,457,438, which is a (Continued)

(30) Foreign Application Priority Data

Jan. 31, 2014 (GB) .................................... 1401772

(51) Int. Cl.
*H04W 72/04* (2023.01)
*H04W 72/23* (2023.01)
(Continued)

(52) U.S. Cl.
CPC ........... *H04W 72/23* (2023.01); *H04W 16/14* (2013.01); *H04W 72/20* (2023.01); *H04W 72/51* (2023.01);
(Continued)

(58) Field of Classification Search
CPC ..... H04W 72/23; H04W 72/20; H04W 72/51; H04W 72/0446; H04W 72/21; H04W 16/14; H04W 76/14; H04W 88/06
See application file for complete search history.

(56) References Cited

U.S. PATENT DOCUMENTS 10,785,766 B2 * 9/2020 Rakotoharison ...... H04W 76/14
2011/0312331 A1 12/2011 Hakola et al.
(Continued)

FOREIGN PATENT DOCUMENTS

EP 2566270 A1 7/2017
JP 2012-502507 A 1/2012
(Continued)

OTHER PUBLICATIONS

Japanese Office Action for JP Application No. 2021-000431 dated Mar. 29, 2022 with English Translation.
(Continued)

*Primary Examiner* — Barry W Taylor

(57) ABSTRACT

The present invention provides for a method of configuring a physical channel, such as a physical control channel, for device-to-device communication between mobile terminal devices within a cellular communications network environment and comprising a step of locating a device-to-device control channel within a cellular uplink signaling spectrum, and applying a frequency offset parameter to determine separation of the device-to-device control channel from a cellular uplink control channel, and to related terminal devices and computer program products.

5 Claims, 7 Drawing Sheets

Related U.S. Application Data continuation of application No. 16/936,997, filed on Jul. 23, 2020, now Pat. No. 10,959,220, which is a continuation of application No. 16/380,216, filed on Apr. 10, 2019, now Pat. No. 10,785,766, which is a continuation of application No. 16/111,980, filed on Aug. 24, 2018, now Pat. No. 10,306,623, which is a continuation of application No. 15/449,338, filed on Mar. 3, 2017, now Pat. No. 10,111,218, which is a continuation of application No. 14/774,492, filed as application No. PCT/JP2015/053317 on Jan. 30, 2015, now abandoned.

(51) Int. Cl.
| | |
|---|---|
| H04W 76/14 | (2018.01) |
| H04W 72/20 | (2023.01) |
| H04W 72/51 | (2023.01) |
| H04W 16/14 | (2009.01) |
| H04W 72/21 | (2023.01) |
| H04W 88/06 | (2009.01) |
| H04W 72/0446 | (2023.01) |

(52) U.S. Cl.
CPC ........ *H04W 76/14* (2018.02); *H04W 72/0446* (2013.01); *H04W 72/21* (2023.01); *H04W 88/06* (2013.01)

(56) References Cited

U.S. PATENT DOCUMENTS

| | | | |
|---|---|---|---|
| 2012/0129540 A1 | 5/2012 | Hakola et al. | |
| 2013/0322382 A1 | 12/2013 | Dinan | |
| 2013/0322413 A1* | 12/2013 | Pelletier | H04W 76/14 |
| | | | 370/336 |
| 2014/0036810 A1* | 2/2014 | Harrison | H04L 5/0094 |
| | | | 370/329 |
| 2014/0185530 A1 | 7/2014 | Kuchibhotla et al. | |
| 2014/0187283 A1 | 7/2014 | Nimbalker et al. | |
| 2014/0204847 A1* | 7/2014 | Belleschi | H04W 76/14 |
| | | | 370/329 |
| 2014/0233476 A1 | 8/2014 | Kwak et al. | |
| 2014/0328329 A1 | 11/2014 | Novlan et al. | |
| 2015/0271846 A1* | 9/2015 | Kowalski | H04W 72/23 |
| | | | 370/329 |
| 2016/0057798 A1 | 2/2016 | Chae et al. | |
| 2016/0183219 A1 | 6/2016 | Kim et al. | |
| 2016/0212785 A1* | 7/2016 | Fujishiro | H04L 47/40 |
| 2016/0255617 A1 | 9/2016 | Lu et al. | |
| 2017/0134146 A1 | 5/2017 | Chae et al. | |
| 2017/0181142 A1 | 6/2017 | Rakotoharison et al. | |
| 2017/0207815 A1 | 7/2017 | Chae et al. | |
| 2018/0332574 A1 | 11/2018 | Lu et al. | |

FOREIGN PATENT DOCUMENTS

| | | |
|---|---|---|
| WO | WO-2012/159270 A1 | 11/2012 |
| WO | WO-2014/001902 A2 | 1/2014 |
| WO | WO-2015/062020 A1 | 5/2017 |

OTHER PUBLICATIONS

3GPP TS 36.211 V9.1.0, Technical Specification, "3rd Generation Partnership Project: Technical Specification Group Radio Access Network: Evolved Universal Terrestrial Radio Access (E-UTRA), Physical Channels and Modulation," (Release 9), (Mar. 2010), 85 pp.

3GPP TS 36.213 V9.1.0, Technical Specification, "3rd Generation Partnership Project: Technical Specification Group Radio Access Network: Evolved Universal Terrestrial Radio Access (E-UTRA): Physical Layer Procedures," (Release 9), (Mar. 2010), 79 pp.

India Examination Report issued in Indian Patent Application No. 8018/DELNP/2015, dated Aug. 21, 2019, 7 pages.

International Search Report, Corresponding to PCT/JP2015/053317, dated May 29, 2015, 2 pp.

Japanese Notice of Reasons for Refusal issued in Japanese Patent Application No. 2018-237146, dated Mar. 10, 2020, 6 pages.

Notification of Reasons for Refusal issued by the Japan Patent Office for Japanese Application No. 2015-544667 dated Sep. 4, 2018 (6 pages).

United Kingdom Intellectual Property Office Search Report, corrsponding to GB Application 1401772.7, dated May 23, 2014, 4 pp.

ZTE, "Control Channel Design for D2D link," 3 GPP TSG-RAN WG1 Meeting #75, R1-135369. Agenda Item 6.2.8.1.2, San Francisco, USA, Nov. 11-15, 2013 (5 pages).

\* cited by examiner

CHANNEL CONFIGURATION IN DEVICE-TO-DEVICE COMMUNICATIONS

CROSS-REFERENCE TO RELATED APPLICATIONS

The present application is a continuation application of U.S. patent application Ser. No. 17/190,866 filed on Mar. 3, 2021, which is a continuation application of U.S. patent application Ser. No. 16/936,997 filed on Jul. 23, 2020, which is issued as U.S. Pat. No. 10,959,220, which is a continuation application of U.S. patent application Ser. No. 16/380,216 filed on Apr. 10, 2019, which is issued as U.S. Pat. No. 10,785,766, which is a continuation application of U.S. patent application Ser. No. 16/111,980 filed on Aug. 24, 2018, which is issued as U.S. Pat. No. 10,306,623, which is a continuation application of U.S. patent application Ser. No. 15/449,338 filed on Mar. 3, 2017, which is issued as U.S. Pat. No. 10,111,218, which is a continuation application of U.S. patent application Ser. No. 14/774,492 filed on Sep. 10, 2015, which is a National Stage Entry of international application No. PCT/JP2015/053317 filed on Jan. 30, 2015, which claims the benefit of priority from United Kingdom Patent Application No. 1401772.7 filed on Jan. 31, 2014, the disclosures of all of which are incorporated in their entirety by reference herein.

TECHNICAL FIELD

The present invention relates to the allocation and configuration of Device-to-Device (D2D) channels for use by mobile radio communication devices such as User Equipments (UE) operating within a cellular communications network environment. In particular the invention relates to a method of configuring D2D channels within such an environment, a method of operating a UE to achieve such configuration, and related UE devices and computer programming products providing for such configuration.

BACKGROUND ART

The concept of proximity based services (ProSe) within a cellular communications network environment has been identified as a mechanism for improving communication capacity and quality for service for UEs operating within such an environment while improving network capability by UEs off-loading. D2D communication is intended to allow for appropriate quality of service communication, between UEs operating within a cellular network environment and employing some network resources but not requiring communication through the network.

SUMMARY OF INVENTION

Technical Problem

Recent developments and discussions within the 3$^{rd}$ Generation Partnership Product (3GPP) community have identified requirements for D2D functionality and which include in particular the support of unicast communications between UEs, for example UE pairs, in D2D communication or the support of broadcast or groupcast communications between UEs, for example from some UE towards other UEs.

However, current proposals remain limited and, while some potential features have been identified and discussed, proposals for various aspects such as the configuration of physical channel resources remain limited and as yet undeveloped.

Such known discussions have centred on potential core system assumptions. That is, while potential agreement has been reached that a cell's uplink spectrum should be used for D2D communication, there are currently only proposals that the allocation of radio resources for D2D communication be centralised within the cell base station (eNB) or Cluster Head of the cluster of terminal devices. Also a further proposal is that the assignment of resources for D2D communication be performed with reference to the legacy Physical Downlink Control Channel (PDCCH) of the cellular network. Yet further it has also been discussed that multiplexing between cellular uplink and D2D transmissions, that is either data and/or control-related information, within a common subframe can be employed and that a specific Physical Control Channel be introduced for D2D communication (P2CCH) to carry control information directly between the UEs engaged in D2D communication, i.e. the so-called peer UEs of a D2D pair. Such a proposed P2CCH D2D channel can support functionality such as a Hybrid Automatic Repeat Request (HARQ) mechanism for the exchange of Ack/Nack feedback between the peer UEs, or for the estimate of radio conditions between the peer UEs, such as the exchange of Channel Quality Indicator (CQI) information.

Further, in addition to the newly proposed control channel, a new Physical Shared Channel is illustrated for D2D communication (P2SCH) for the transport of data, such as user data or user signalling, directly between the peer UEs.

In relation to such proposals, there are different suggestions for resource allocation/configuration in relation to D2D communication scenarios within cellular communication networks. However current suggestions exhibit inefficiencies and tend to have an undesired impact on the cellular environment and in particular in relation to the legacy Physical Uplink Control Channel (PUCCH) and base station (eNB) functionality of a cell.

One such known system is disclosed in WO2012/159270 and which comprises a mechanism for allocating communication resources of a cellular communication network to D2D communication but which is disadvantageously limited and simply focuses on legacy radio resources, such as the frequency-band and resource-pool to be employed for D2D communication.

The present invention seeks to provide for a method of configuring channel resources to convey control information for D2D communication within a cellular communications network environment, and to related mobile communication terminal devices and computer program products, having advantages over known such method related devices and computer programme products.

Solution to Problem

According to one aspect of the present invention there is provided a method of configuring a physical channel, such as a physical control channel, for device-to-device communication between mobile terminal devices within a cellular communications network environment and comprising a step of locating a device-to-device control channel within a cellular uplink signalling spectrum, and applying a frequency offset parameter to determine separation of the device-to-device control channel from a cellular uplink control channel.

In particular, the step of locating the device-to-device control channel can be determined within one of the said mobile terminal devices.

According to another aspect of the present invention there is provided a method of operating a mobile terminal device for device-to-device communication within a cellular network environment and including, within the device, the step of locating a device-to device control channel within a cellular uplink signalling spectrum, and applying a frequency offset parameter to determine separation of the device-to-device control channel from a cellular uplink control channel.

The present invention, in all its various aspects, proves advantageous when considering possible impact on cellular connectivity within the network environment, and the legacy PUCCH in particular. It proves possible in particular to maintain downlink cellular capacity, and avoid radio interference between the legacy PUCCH and the configured P2CCH, through setting the said frequency offset to establish the appropriate distance/separation between the two control channels.

Further, the invention will exert only limited impact on an eNB scheduler through the effective separation of the D2D and cellular controls, i.e. through the provision of separate scheduling.

Also, only limited added functionality and/or complexity need arise at the mobile terminal device, due to adoption of legacy cellular-channel calculation algorithms as described further herein.

Yet further, it can advantageously prove possible to maintain single carrier characteristics for SC-FDMA transmission in all channels and thereby avoiding PUSCH fractioning.

Of course the offset value can be established in the context of Resource Blocks.

The methods can also include the step of identifying the bandwidth of the device-to-device control channel.

Preferably, the methods include a step of determining the frequency offset by reference to cellular network uplink/downlink signalling.

Advantageously, the step of determining the frequency offset parameter can include an adaption of an algorithm employed for determining physical uplink control channel characteristics within the cellular network environment.

Further, the terminal device can receive data identifying the location of the device-to-device control channel by way of Radio Resource Control SIB messaging.

If required, the methods can also include the step of identifying common configuration parameter values between terminal devices. Advantageously the common configuration parameter values can be computed by means of a message exchange, such as a random channel access procedure between two mobile terminal devices.

Also, the common configuration parameter values can be determined on the basis of RRC SIB signalling in which neighbouring cell parameters are broadcast.

The methods can thus be provided, for configuration of a mobile terminal device when served by a different cell of that of another mobile terminal device within a Radio Access Network.

The methods can also be provided relation to a mobile terminal device outside RAN coverage of that of another mobile terminal device including the configuration of physical control channel for the device-to-device communication by way of a previously camped-on cell, or by way of a pre-set value in the USIM.

If required, the method can include the step of employing a discovery beacon for transport of device-to-device channel location parameters between the mobile terminals, and/or include the step of employing initial access signalling within a legacy random access procedure for the exchange of initial access messaging.

Also, the method can include the step of employing a X2 message/parameter for network-node to network-node communications for building neighbouring cell physical channel parameters.

According to a further aspect of the present invention there is provided a cellular communications network mobile terminal device arranged for device-to-device communication with a further mobile terminal device and arranged for locating a device-to-device control channel within a cellular uplink signalling spectrum, and applying a frequency offset parameter to determine separation of the device-to-device control channel from a cellular uplink control channel.

Such a device can be arranged to operate in accordance with any one or more of the method features noted above.

According to a yet further aspect of the present invention there is provided a computer program product for a computer device, comprising software code portions for performing the steps of any of the above method features when said product is run on the computer device.

Also, the computer program product can comprise a computer-readable medium on which said software code portions are stored.

Likewise, the computer program product of the invention can be directly loadable into the internal memory of the computer device and/or transmittable via a network by means of at least one of upload, download and push procedures.

BRIEF DESCRIPTION OF DRAWINGS

The invention is now described further, by way of example only, with reference to the accompanying drawings in which.

DESCRIPTION OF EMBODIMENTS

Figure 1:
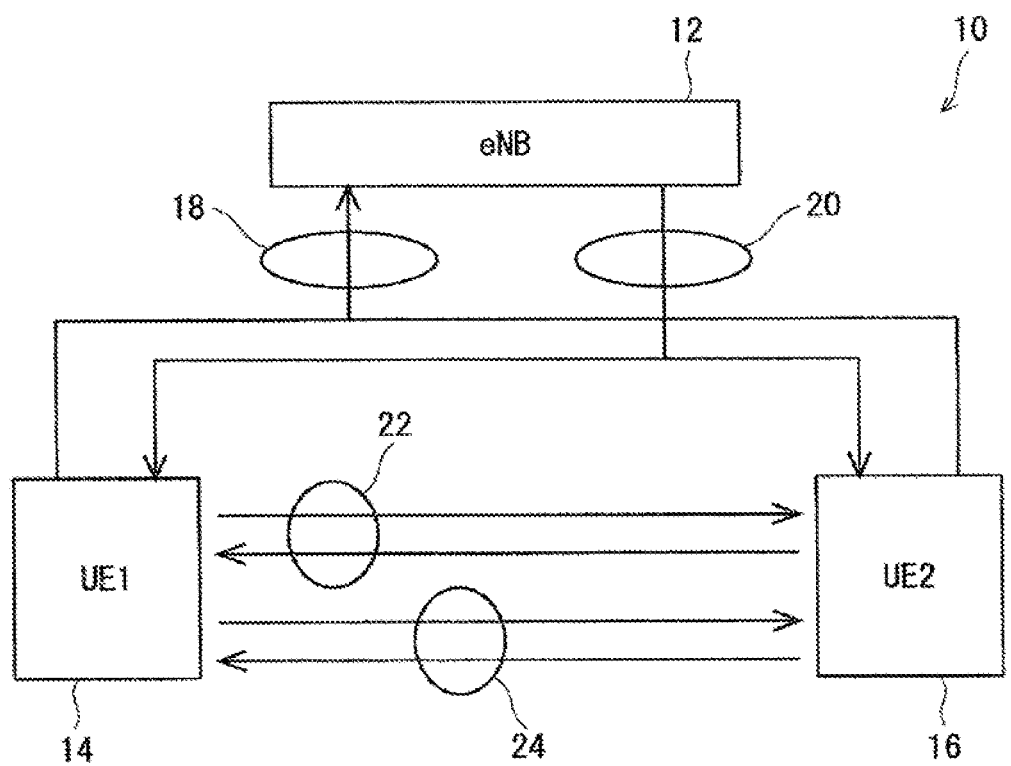
FIG. 1 is a schematic diagram illustrating D2D communication between peer UEs within a cellular network environment in which the invention can be adapted.

Referring now to FIG. 1 there is provided a schematic representation of terminal devices within a cellular communication network environment 10 and comprising a base station device in the form of an eNB 12, a first mobile radio communications terminal device such as a first UE 14 and a second such mobile radio communications device such as a second UE 16.

As illustrated by the signalling to be discussed further below, the first and second UEs 14, 16 are arranged to exchange cellular uplink and downlink signalling with the eNB 12 by way of uplink and downlink control and shared channels in accordance with cellular communication functionality. In addition, and in accordance with the field of the present invention, the UEs 14, 16, are also arranged for D2D communication with advantageously reduced/limited impact on the cellular network resources. Schematically illustrate therefore are uplink control/data channels PUCCH/PUSCH 18 for uplink control/data traffic from the first 14 and second 16 UEs to the eNB 12. There are also schematic illustrated downlink control/data channels PDCCH/PDSCH 20 for receipt at each of the UEs 14, 16 of data from the network, i.e. eNB 12.

As noted, the UEs 14, 16 are also arranged to form a UE pair for mutual D2D communication and, in this context, and on the basis of the concept of the present invention, D2D control information 22, such as HARQ feedback signalling, can be exchanged between the two UEs 14, 16 by way of a physical control channel, and D2D data can be exchanged 24 between the two UEs 14, 16 by way of a physical shared data channel. Such control and data channels are specific to the D2D communications and within the present application are identified as P2CCH and P2SCH respectively.

While a single cell common Radio Access Network (RAN) is illustrated with reference to FIG. 1, it should be appreciated that the present invention can be employed by a D2D UE pair according to various network configuration scenarios. That is, in addition to adoption in relation to a UE pair such as operating under Frequency Division Duplex (FDD) or Time Division Duplex (TDD) RAN coverage in an intra-cell scenario such as that in FIG. 1, where both UEs 14, 16 are served by a single cell, the invention also finds use in relation to an inter-cell coverage scenario in which the UEs are served by different cells/eNBs.

Yet further, the invention can also be adopted in relation to UEs operating outside RAN coverage as discussed further herein but still allowing for the exchange of D2D data between a UE pair by way of unicast communication.

It should also be appreciated from the above summary of the present invention and the following discussions, that the invention is advantageous in providing for management of the coexistence of legacy uplink channels PUCCH, PUSCH, and D2D channels P2CCH, P2SCH within the uplink band spectrum consisting of PUCCH and PUSCH. As a particular advantage, the invention allows for both UE devices within a D2D UEs pair to identify the location of radio resources in time and/or frequency, at which transmission/reception should be attempted in the uplink band so as to access the D2D control information related to that D2D UEs pair link. Also, the invention allows for the cellular network node device, such as the eNB, to discriminate between transmissions on the legacy uplink channels from those on the D2D channels and, in general terms, allows for the reduction in potential interference between the channels and impact of one on the other.

Figure 2:
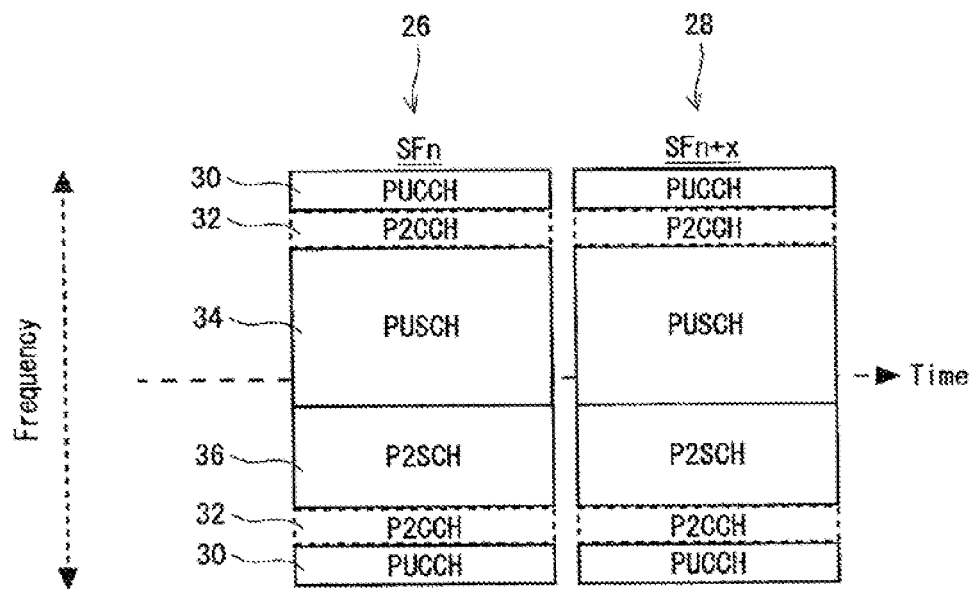
FIG. 2 is a schematic representation of successive subframes illustrating configuration according to one aspect of the present invention.
Figure 3:
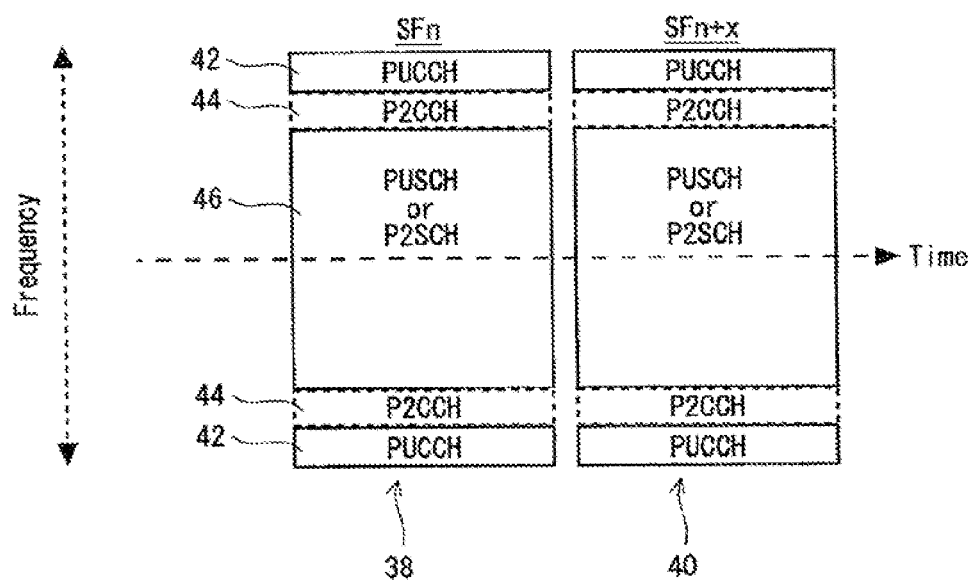
FIG. 3 is a schematic representation of successive subframes illustrating configuration according to another aspect of the present invention.

With regard to FIG. 2 and FIG. 3, there are illustrated schematic representations of the structure of adjacent subframes and related Resource Blocks providing for adoption of the P2CCH and P2SCH channels within the context of the present invention for D2D communication and particularly for coexistence with the legacy uplink control and shared data channels, PUCCH, PUSCH.

Turning first to FIG. 2, the Resource Blocks considered in the frequency domain and within the adjacent subframes 26, 28, within their frequency spectrum, are divided between PUCCH channel element 30, D2D P2CCH channel element 32 for D2D control information exchanges between the D2D UEs pair, a PUSCH channel 34 for cellular network data uplink exchanges, and a D2D P2SCH channel 36 for D2D data exchanges between that pair.

FIG. 2 illustrates the coexistence between the uplink and D2D channels on a Frequency Division Multiplex basis such that Resource Blocks of the adjacent subsequent subframe 28 exhibit the same characteristics as the preceding subframe 26.

Turning now to FIG. 3, there is provided similar structural diagram of adjacent subframes 38, 40 within a series and again, by reference to the frequency spectrum, being divided between uplink control channel PUCCH portions 42, D2D control channel P2CCH portions 44 and 46, in this particular example, Uplink and/or D2D shared channels PUSCH/P2SCH for data exchanges. Again, the structure of the subsequent subframe 40 mirrors that of the initial subframe 38 so as to represent a full FDM scenario within the uplink channel spectrum between the uplink and D2D control PUCCH/P2CCH and data PUSCH/P2SCH channels.

While it would be possible to employ time division multiplexing for the coexistence of the uplink and D2D control and data channels, such an arrangement may exhibit a more restricted operation as regards legacy PUCCH bandwidth availability, and increased latency, for the respective control channels, or can further inhibit the flexibility of the eNB in dividing the uplink spectrum bandwidth between the D2D uplink transmissions and thus adapting to network load.

One particular example of an arrangement for arriving at an FDM subframe structure such as illustrated in particular with reference to FIG. 3, is now described with reference to FIG. 4.

Figure 4:
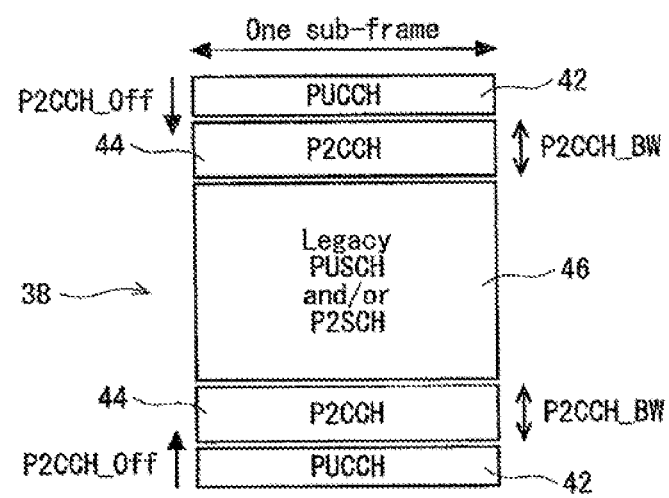
FIG. 4 is a schematic diagram of a subframe exhibiting configuration according to the embodiment of FIG. 3.

FIG. 4 illustrates in particular the adoption of new system parameters serving to define the location of the P2CCH channel for the D2D communication.

The location of this D2D control channel P2CCH is advantageously defined by way of two parameters, referenced to the frequency spectrum employed by uplink Resource Blocks and first comprising a frequency offset parameter by means of which the D2D control channel P2CCH is offset relative to the legacy uplink control channel PUCCH, and also the actual D2D control channel P2CCH bandwidth. Such parameters are shown in FIG. 4 which illustrates in the context of one subframe, a Resource Block 38 encompassing a frequency spectrum (not shown) in a vertical direction as illustrated in FIG. 3 and, as previously noted, employing uplink control channel portions 42, D2D control channel portions 44 and shared general portion 46 for uplink and/or D2D data.

As illustrated by the arrows P2CCH Off associated with each of the uplink control channel regions 42, the D2D control channel 44 is offset, in accordance with the frequency division multiplexing requirements, relative to the uplink control channel 42. The second parameter comprises the bandwidth of the D2D control channel 44 which, in FIG. 4 is illustrated by double-headed arrow P2CCH_BW.

Thus, the D2D parameters P2CCH Off and P2CCH_BW serve to define the location, through frequency offset, and bandwidth, of each of the D2D control channels 44. The remainder of the Resource Block spectrum then not employed by the UE respective uplink and D2D control channels 42, 44 is available for the shared communication channel 46. Of course the alternative of FIG. 2 with respective FDM D2D and uplink shared data channels can be similarly employed.

As noted previously, the parameters exhibited by the present invention can also be employed in accordance with different network radio coverage scenarios.

In particular, for the radio coverage scenario in which the D2D UEs pair are within network coverage, the parameters tend to be unique to each cell and the values are provided to camped-on UEs through the radio resource control SIB signalling. That is, for intra-cell coverage where both of the D2D UEs pair are within the same cell, both UEs can compute the location of the Resource Blocks, and the number of allocated Resource Blocks to be used, by running an algorithm which can be such as that employed for identification of the Resource Blocks in the PUCCH channel, and adding the aforementioned P2CCH Off value to the outcome.

For a radio coverage scenario in which the D2D UEs pair are in inter-cell coverage, the D2D UEs pair are likely to have different values for the offset and bandwidth parameters duplet and so a common duplet should be identified. As outlined further below, such common duplet can be defined by reference to the intersection of the two P2CCH zones, and the P2CCH_BW parameters can be advantageously employed for computing such a common duplet.

Further details of determining the parameters employed within the invention and the common duplet are outlined further below. However, with regard to an out-of-coverage network scenario, the D2D UEs pair may also exhibit different values for the duplet, which can arise from pre-set values, or previously received values when under network coverage, and a similar procedure to that adopted in relation to the inter-cell coverage to determine a common duplet as discussed further below can be employed.

A further feature of the invention relates to a procedure for a recipient UE in a D2D UEs pair to position/assign an appropriate P2CHH channel for the transfer of control information such as D2D HARQ feedback signalling.

Various forms of algorithm are possible for such location/assignment although one particularly advantageous embodiment is based upon algorithms employed for the assignment of, for example, control channel radio resources of the legacy PUCCH channel based upon information concerning the location of assigned information in the legacy downlink control channel PDCCH.

Such legacy algorithm and the associated assignment/location is known from legacy LTE systems such as disclosed in 3GPP Technical Specification TS 36.211 in section 5.4 the full content of which is incorporated herein by reference, and but for completeness, the principal sections are outlined below as follows:

5.4.3 Mapping to Physical Resources

The block of complex-valued symbols z(i) shall be multiplied with the amplitude scaling factor $\beta_{PUCCH}$ in order to conform to the transmit power $P_{PUCCH}$ specified in Section 5.1.2.1 in [4], and mapped in sequence starting with z(0) to resource elements. PUCCH uses one resource block in each of the two slots in a subframe. Within the physical resource block used for transmission, the mapping of z(i) to resource elements (k,l) not used for transmission of reference signals shall be in increasing order of first k, then l and finally the slot number, starting with the first slot in the subframe.

The physical resource blocks to be used for transmission of PUCCH in slot $n_s$ are given by $$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases}$$

where the variable m depends on the PUCCH format. For formats 1, 1a and 1b $$m = \begin{cases} N_{RB}^{(2)} & \text{if } n_{PUCCH}^{(1)} < c \cdot N_{cs}^{(1)}/\Delta_{shift}^{PUCCH} \\ \left\lfloor \frac{n_{PUCCH}^{(1)} - c \cdot N_{cs}^{(1)}/\Delta_{shift}^{PUCCH}}{c \cdot N_{sc}^{RB}/\Delta_{shift}^{PUCCH}} \right\rfloor + & \\ N_{RB}^{(2)} + \left\lceil \frac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

and for formats 2, 2a and 2b $$m = \lfloor n_{PUCCH}^{(2)}/N_{sc}^{RB} \rfloor$$

Figure 5:
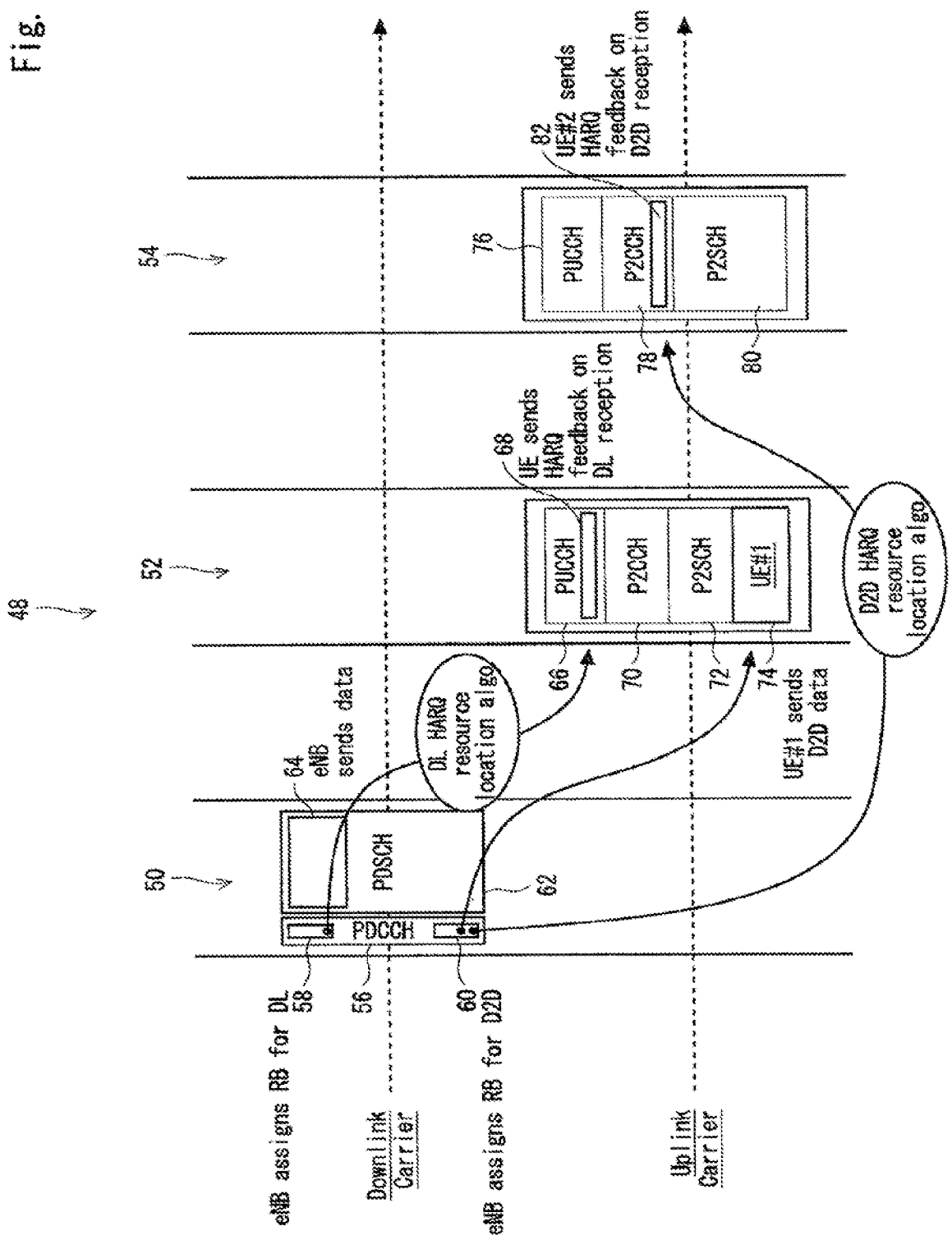
FIG. 5 is a signalling diagram illustrating transmission sequence for legacy network transmissions and D2D communication.

Mapping of modulation symbols for the physical uplink control channel is illustrated in Figure 5.4.3-1.

In case of simultaneous transmission of sounding reference signal and PUCCH format 1, 1a or 1b, one SC-FDMA symbol on PUCCH shall be punctured.

Figure 8:
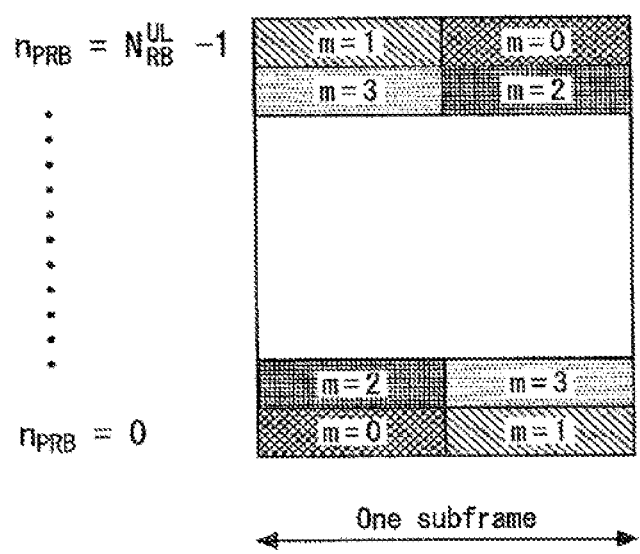
FIG. 8 is a conceptual diagram of "Figure 5.4.3-1: Mapping to physical resource blocks for PUCCH" disclosed in section 5.4 of 3GPP TS 36.211.

FIG. 8 is a conceptual diagram of "Figure 5.4.3-1: Mapping to physical resource blocks for PUCCH" disclosed in section 5.4 of 3GPP TS 36.211

For the D2D communication arising in relation to the present invention, the assigned/location of the required P2CCH is derived from the use of such known algorithm wherein both UEs in a D2D pair receive the assignment for the D2D transmission for data, and the UE receiving the data is arranged to run the aforementioned legacy algorithm which provides a "virtual" Resource Blocks location in the physical uplink control channel. The receiving UE can then add the aforementioned offset P2CCH Off value to the outcome of the algorithm within the frequency spectrum as disclosed in relation to FIG. 4 so as to move to the "effective" computed Resources Blocks in the P2CCH zone.

An example of the transmission sequence arising between an eNB and a D2D UE pair, for both the legacy signalling, and for D2D control channel configuration according to an embodiment of the present invention is now discussed further with reference to FIG. 5.

FIG. 5 represents a timing diagram within a frequency spectrum (vertical access but not specifically illustrated) encompassing both a downlink carrier and uplink carrier and also illustrating the UE Resource Blocks appearing within a series of subframes 50, 52, 54 relating, as noted, to both the legacy signalling and the D2D control and data channel P2CCH, P2SCH signalling within the legacy uplink spectrum.

Within subframe 50, and within the downlink carrier spectrum, there is provided a physical downlink channel 56 within which a eNB (not shown) assigns a Resource Block 58 for downlink traffic and within which the eNB also assigns a Resource Block 64 for D2D communication between first and second UEs of a D2D pair. The subframe 50, also includes a Resource Block 62 representing a downlink shared channel by means of which the eNB sends data 64 related to the RB assignment 58 to the UE.

With regard to the legacy elements of the signalling, a downlink HARQ resource location algorithm is applied so as to identify a portion within PUCCH channel 66 employed by a first UE while sending HARQ feedback 68 on downlink reception at the first UE. Within the next subframe 52 illustrated, a physical control channel 70 is calculated on the basis of the legacy algorithm as discussed above. However, with regard to the Resource Block 64 assigned by the eNB for D2D communication, the first UE sends D2D data 74 to the second UE within the D2D pair. Referring to the Resource Block structure within the subframe 54, there is again provided a physical uplink control channel 76, and a physical control channel 78, for D2D communication and associated shared data channel 80. Referring again to the assignment by the eNB of the Resource Block 64 D2D communication, the adapted D2D HARQ resource location algorithm is applied to provide for the required HARQ signalling 82 on D2D reception.

Although, within the context of the control channel signalling, reference is made above to the HARQ mechanism, it should be appreciated that the subject matter of the present invention could equally be implemented in relation to any other required control information, such as for example CQI information.

As also discussed above, the present invention is not limited solely to D2D UE pairs operating D2D communication within the same cell, and inter-cell, or indeed out-of-coverage, adoption of the concept of the present invention can also be achieved.

An appropriate interworking rule is proposed to cover embodiments relating to inter-cell, or out-of-coverage, D2D communication for a UE pair. In both instances, the two UEs in the D2D pair do not exhibit the same duplet, i.e. offset value and/or control channel bandwidth, since they are camping on different cells. However, to allow for the D2D communication, both UEs can be arranged to compute the intersection/overlap of their respective P2CCH zones to identify a common duplet and such feature is described further with reference to FIG. 6.

Figure 6:
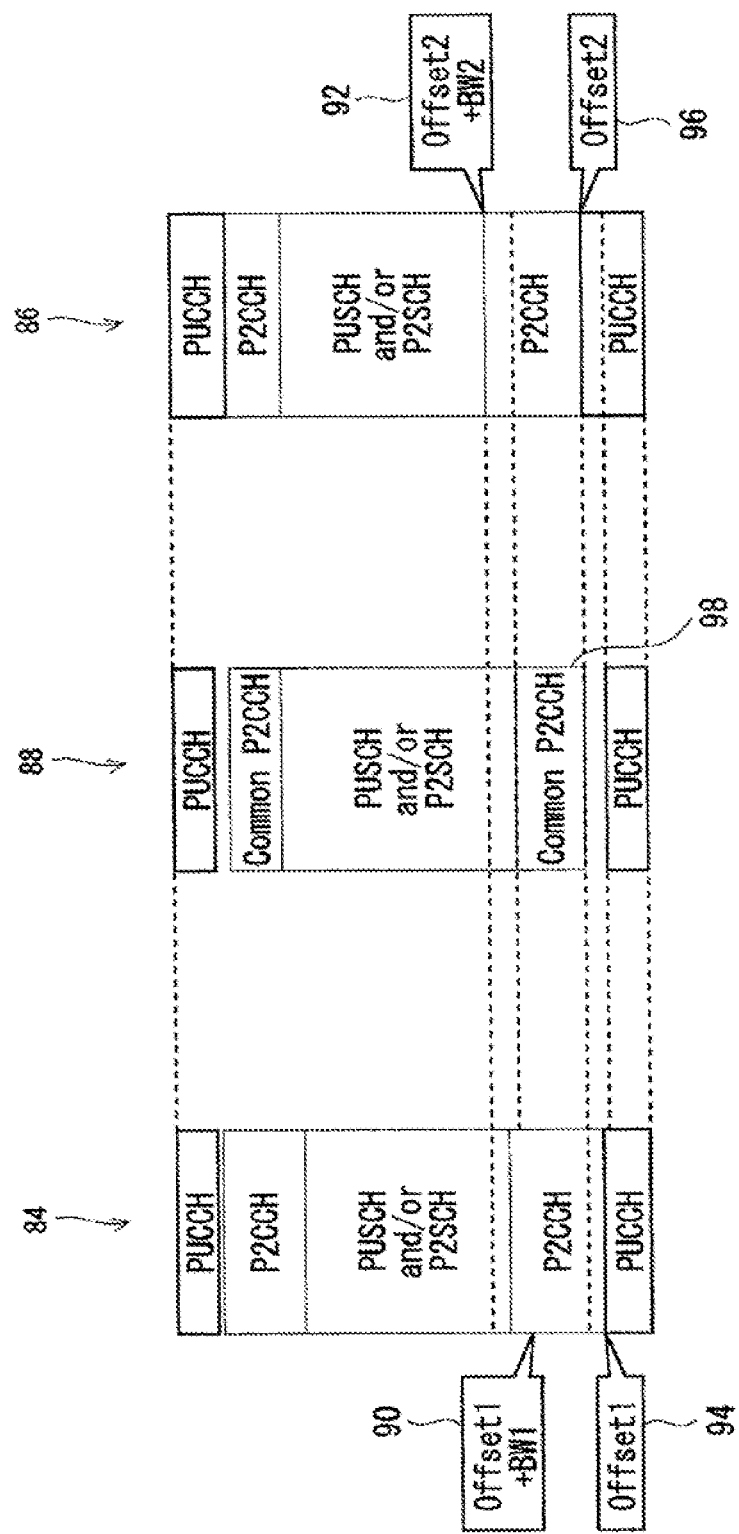
FIG. 6 is a schematic representation of subframe configuration according to a further feature of the present invention.

FIG. 6 illustrates Resource Block structures for first 84, and second 86 UEs within a D2D UE pair, and both of which include functionality according to a feature of the present invention so as to provide for a virtual common Resource Block configuration 88 as illustrated.

The basic structure illustrated within the sub-frames for each of the two UEs 84, 86 is based upon a feature of an embodiment of the present invention illustrated with reference to FIG. 4. As such, they provide for a FDM scheme within the frequency spectrum of the legacy uplink channel, and wherein the Resource Block structure includes uplink control channel zones, offset derived D2D control channel zones, and shared data channels for uplink and/or D2D communication as required.

However, as illustrated, in view of the differences arising from the two UEs 84, 86 camping on different cells, there is quite likely to be a lack of coincidence between the respective boundaries of the respective D2D control channels P2CCH. That is, UE 84 exhibits an upper boundary for its D2D control channel equivalent to "offset 1+bandwidth 1"; and UE 86 exhibits an upper boundary for its D2D control channel P2CCH of "offset 2+bandwidth 2" where respective "offset 1", 94 and "offset 2", 96 are determined relative to the legacy uplink control channels PUCCH as discussed above.

In order to arrive at the common configuration structure 88, the upper boundary is determined as the minimum of the two values 90, 92, whereas the lower boundary is determined as the maximum of the two offset values 94, 96 and as illustrated by the dotted lines in FIG. 6.

Applying such combined limits leads to a common P2CCH control channel 98 as illustrated and so allows for adoption of the mechanism of the present invention for inter-cell and out-of-coverage scenarios.

Figure 7:
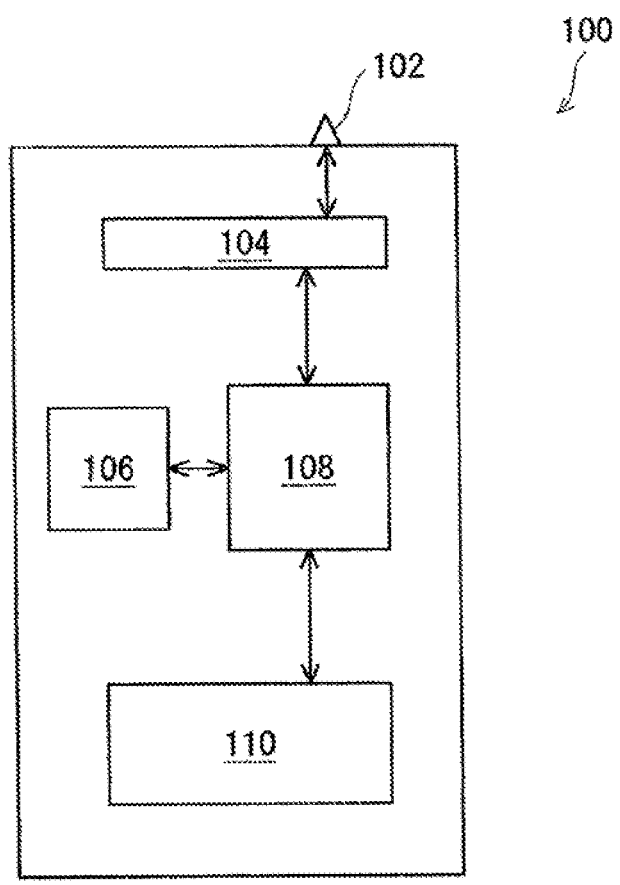
FIG. 7 is a schematic representation of a mobile radio communications terminal device arranged to operate in accordance with an embodiment of the present invention.

Turning now to FIG. 7, there is provided a schematic illustration of a mobile terminal device offering communication over cellular network and comprising for example, a UE 100 of a D2D UE pair.

The UE 100 includes standard functionality such as a transmission/reception interface comprising an antenna 102 and transmission/reception circuitry 104 in addition to memory functionality 106, processor functionality 108 and a user interface 110.

In accordance with the present invention, the processor functionality 108 includes means for achieving the required channel configuration according to the present invention so as to enable the D2D communication exchanges exhibiting the advantages presented by the invention. That is, the processor functionality 108 can be arranged to determine and/or apply parameter values arising in accordance with the present invention and serving to identify the frequency offset values and bandwidth values as discussed.

In particular, the processor functionality 108 can be arranged to determine the aforementioned frequency offset value by reference to legacy algorithms determining initial physical Resource Blocks for control information transportation and applying the required frequency offset to the results obtained therefrom. In this manner, such D2D UE 100 can determine the location of the required physical Resource Blocks for the transport of D2D control information, although it should be appreciated here that other mathematical operation, i.e. sum, subtraction etc. can be employed.

As will also be appreciated, various mechanisms exist for supporting the signalling exchange for the D2D control channel system parameters according to the present invention, and which can relate to the particular network terminal and/or node devices involved in the signalling exchange.

For example, while for exchanges between a terminal node such as eNB and a mobile terminal such as a UE, RRC System Information Broadcast (SIB) messages/parameters can be employed, an eNB can broadcast its own cell parameter set. Also the eNB can broadcast a parameter set of neighbouring cells if required and which can prove useful for out-of-coverage embodiments as discussed above.

For communication between the UEs, it can of course prove necessary to supply data for computing the common configuration features such as discussed in relation to FIG. 6. Here, transport options include use of a discovery beacon to convey P2CCH parameters and/or the use of initial access signalling in legacy random access procedures such as the D2D UE pair exchanging initial access messaging including their specific P2CCH parameters. Other alternative option is that specific P2CCH parameter set data can be employed and also, if required, a camped-on cell identity can prove advantageous in allowing retrieval of a parameter set in the neighbouring cell P2CCH parameters within the SIB.

For network terminal node, e.g. eNB to eNB, signalling, use can be made of X2 interface messages/parameters which can also prove useful for building neighbouring cell P2CCH messages/parameters as required.

As will therefore be appreciated from the above, the present invention provides for an advantageous scheme that can be readily embodied within a channel configuration procedure, terminal device operation procedure, and related computer program product, to advantageously allow for D2D capable UEs to determine which part of the legacy uplink band can be advantageously dynamically used for D2D, and P2CCH purposes in particular.

It should be appreciated that in particular there can be provided system parameters to define the location of a proposed P2CCH channel, such parameters comprising: P2CCH Frequency Offset employed to compute the frequency shifting from legacy PUCCH and hence get the P2CCH lower boundary if the offset is added to the PUCCH lower boundary; and P2CCH bandwidth employed to get the P2CCH upper boundary.

A particular algorithm function can be employed for location of physical resource blocks for D2D physical control channel, and such proposed algorithm can be based on legacy LTE algorithm found in Technical Specification 36.211 as noted above. After running the legacy algorithm to find initial physical resource blocks to transport control information, P2CCH Frequency Offset can be used to allow the D2D UEs to find physical resource blocks to transport D2D control information. Of course it should be appreciated that other mathematical operation could be used such as sum, subtraction, etc.

Further exemplary detail of the manner and transfer of physical control information can be as suggested by 3GPP Technical Specification 36.213, the content of which is again incorporated herein by reference.

Suggested signalling options for P2CCH system parameters can comprise the use of RRC signalling to provide the proposed system parameters: SIB or dedicated RRC messages, and such parameters could also be pre-configured in the UEs: pre-set by the network operator in USIM or predefined by the 3GPP specifications.

The advantageous adoption of the above-mentioned interworking computation rule for non matching cell-derived parameter can focus upon the intersection of the P2CCH zones computed from the P2CCH Frequency Offset and P2CCH bandwidth parameters could be chosen to find the common duplet used by UEs which have been provided different P2CCH configuration. Of course, any other rule using the P2CCH Frequency Offset and P2CCH bandwidth parameters could also be used such as union rule, sum rule etc.

The signalling for such interworking can allow for the exchange of the proposed system parameters between eNB using X2 interface. Further, the proposed system parameters could also be exchanged between UEs using discovery beacons or legacy radio access signalling between D2D UEs.

The efficient dynamic operation and assignment of D2D channel resources according to the present invention is achieved in a particular advantageous manner. In particular, there is little if any limiting impact on legacy PUCCH, and hence it remains possible to maintain downlink cellular capacity.

Further, radio interference between legacy PUCCH and P2CCH can readily be avoided by setting P2CCH Off to create the right separation/distance between the two channels. There is also an advantageously limited impact on eNB scheduler through the persistent availability of cellular control signalling whose scheduling can be separated from D2D scheduling.

There is also only limited added complexity from the UE point of view, particularly when considering reuse of the legacy algorithm.

Finally it remains possible to maintain Single Carrier characteristics for SC-FDMA transmission in all channels and thus minimizing as much as possible PUSCH fractioning.

This application is based upon and claims the benefit of priority from United Kingdom patent application No. 1401772.7, filed on Jan. 31, 2014, the disclosure of which is incorporated herein in its entirety by reference.

The whole or part of the embodiments disclosed above can be described as, but not limited to the following supplementary notes.

Supplementary Note 1

A method of configuring a physical channel for device-to-device communication between mobile terminal devices within a cellular communications network environment and comprising a step of locating a device-to-device control channel within a cellular uplink signalling spectrum, and applying a frequency offset parameter to determine separation of the device-to-device control channel from a cellular uplink control channel.

Supplementary Note 2

A method as claimed in Supplementary note 1, and including the step of, identifying a bandwidth parameter of the device-to-device control channel.

Supplementary Note 3

A method as claimed in Supplementary note 1 or 2, and including the step of determining the frequency offset by reference to cellular network control channel.

Supplementary Note 4

A method as claimed in Supplementary note 3, wherein the step of determining the device-to-device physical radio resource blocks from the frequency offset parameter by including an adaption of an algorithm employed for determining physical uplink control channel characteristics within the cellular network environment.

Supplementary Note 5

A method as claimed in any one or more of Supplementary notes 1-4, and location of the device-to-device control channel is determined within one of the said mobile terminal devices.

Supplementary Note 6

A method as claimed in any one or more of Supplementary notes 1-5, wherein said parameters identifying the location of the device-to-device control channel are delivered to the terminal devices by way of Radio Resource Control cell broadcast so called as SIB or terminal dedicated SIB messaging.

Supplementary Note 7

A method as claimed in any one or more of Supplementary notes 1-5, and including the step of identifying common configuration parameters values between the said terminal devices.

Supplementary Note 8

A method as claimed in Supplementary note 7, wherein the common configuration parameters values are computed by means of messages exchanges between two mobile terminal devices.

Supplementary Note 9

A method as claimed in Supplementary note 7, wherein the common configuration parameter values are determined on the basis of RRC SIB signalling in which neighbouring cell parameters are broadcast.

Supplementary Note 10

A method as claimed in any one or more of Supplementary notes 7-9, and providing configuration of the mobile terminal devices when served by different cells within a Radio Access Network.

Supplementary Note 11

A method as claimed in any one or more of Supplementary notes 1-6, and for mobile terminal devices outside RAN coverage, and including the configuration of a physical control channel for the device-to-device communication by way of a previously camped-on cell, or by way of a pre-set value in the USIM.

Supplementary Note 12

A method as claimed in any one or more of Supplementary notes 1-11, and including the step of employing a discovery beacon for transport of device-to-device channel location parameters between the mobile terminals.

Supplementary Note 13

A method as claimed in any one or more of Supplementary notes 1-11, and including the step of employing initial access signalling within a legacy random access procedure for the exchange of device-to-device channel location parameters.

Supplementary Note 14

A method as claimed in any one or more of Supplementary notes 1-13, and including step of employing an X2 message/parameter for network node to network node communications for providing serving cell physical channel parameters.

Supplementary Note 15

A method of operating a mobile terminal device for device-to-device communication within a cellular network environment and including, within the device, the step of locating a device-to device control channel within a cellular uplink spectrum, and applying a frequency offset parameter to determine separation of the device-to-device control channel from a cellular uplink control channel.

Supplementary Note 16

A method as claimed in Supplementary note 15, and also including the step of identifying the bandwidth of the device-to-device control channel.

Supplementary Note 17

A method as claimed in Supplementary note 15 or 16, and including the step of determining the frequency offset by reference to cellular network control channel.

Supplementary Note 18

A method as claimed in any one or more of Supplementary notes 15-17, wherein the step of determining device-to-device physical radio resource blocks from the frequency offset parameter comprises including an adaption of an algorithm employed for determining physical uplink control channel characteristics within the cellular network environment.

Supplementary Note 19

A method as claimed in any one or more of Supplementary notes 15-18, wherein the terminal device receives said parameters identifying the location of the device-to-device control channel by way of Radio Resource Control SIB messaging.

Supplementary Note 20

A method as claimed in any one or more of Supplementary notes 15-19, and including the step of identifying common configuration parameter values between terminal devices.

Supplementary Note 21

A method as claimed in Supplementary note 20, wherein the common configuration parameter values are computed by means of a message exchange, such as a random channel access procedure between two mobile terminal devices.

Supplementary Note 22

A method as claimed in Supplementary note 20, wherein the common configuration parameter values are determined on the basis of RRC SIB signalling in which neighbouring cell parameters are broadcast.

Supplementary Note 23

A method as claimed in any one or more of Supplementary notes 20-22, for configuration of a mobile terminal device when served by a different cell of that of another mobile terminal device within a Radio Access Network.

Supplementary Note 24

A method as claimed in any one or more of Supplementary notes 15-20, in relation to a mobile terminal device outside RAN coverage of that of another mobile terminal device including the configuration of physical control channel for the device-to-device communication by way of a previously camped-on cell, or by way of a pre-set value in the USIM.

Supplementary Note 25

A cellular communications network mobile terminal device arranged for device-to-device communication with a further mobile terminal device and arranged for locating a device-to-device control channel within a cellular uplink spectrum, and applying a frequency offset parameter to determine separation of the device-to-device control channel from a cellular uplink control channel.

Supplementary Note 26

A terminal device as claimed in Supplementary note 25, and arranged to identify a bandwidth of the device-to-device control channel.

Supplementary Note 27

A terminal device as claimed in Supplementary note 25 or 26, and arranged to determine the frequency offset by reference to cellular network control channel.

Supplementary Note 28

A terminal device as claimed in any one or more of Supplementary notes 25-27, and arranged to determine device-to-device physical resource blocks from the frequency offset parameter by way of algorithm employed for determining physical uplink control channel within the cellular network environment.

Supplementary Note 29

A terminal device as claimed in any one or more of Supplementary notes 25-28, and arranged to receive said parameters identifying the location of the device-to-device control channel by way of Radio Resource Control SIB or terminal dedicated messaging.

Supplementary Note 30

A terminal device as claimed in any one or more of Supplementary notes 25-29, and arranged for identifying configuration parameters common with another terminal device.

Supplementary Note 31

A computer program product for a computer device, comprising software code portions for performing the steps of any one of Supplementary notes 1-24 when said product is run on the computer device.

Supplementary Note 32

A computer program product according to Supplementary note 31, wherein the computer program product comprises a computer-readable medium on which said software code portions are stored.

Supplementary Note 33

A computer program product according to Supplementary note 31 or 32, wherein the computer program product is directly loadable into the internal memory of the computer device and/or transmittable via a network by means of at least one of upload, download and push procedures.

REFERENCE SIGNS LIST

10 cellular communication network environment
12 eNB 12
14 first UE
16 second UE
100 UE
102 antenna
104 transmission/reception circuitry
106 memory functionality
108 processor functionality
110 user interface

The invention claimed is:

1. A mobile terminal device configured to support device-to-device communication with a further mobile terminal device, the mobile terminal device comprising:
   a transceiver configured to receive information which includes a first parameter indicating a start resource block for a device-to-device control channel from upper edge or lower edge in frequency and a second parameter indicating a number of resource blocks forming a bandwidth for the device-to-device control channel; and
   a processor coupled to the transceiver and configured to determine a resource for the device-to-device control channel based on the first parameter and the second parameter.

2. A method of a mobile terminal device configured to support device-to-device communication with a further mobile terminal device, the method comprising:
   receiving information which includes a first parameter indicating a start resource block for a device-to-device control channel from upper edge or lower edge in frequency and a second parameter indicating a number of resource blocks forming a bandwidth for the device-to-device control channel; and
   determining a resource for the device-to-device control channel based on the first parameter and the second parameter.

3. The method according to claim 2, wherein information includes a third parameter regarding a resource of a uplink control channel.

4. The method according to claim 3, wherein the processor is configured to determine the resource for a further device-to-device control channel based on the third parameter.

5. The method according to claim 2, wherein the information is transmitted by a Radio Resource Control message.

* * * * *